US012201091B2

(12) United States Patent
Mellata et al.

(10) Patent No.: US 12,201,091 B2
(45) Date of Patent: Jan. 21, 2025

(54) SIMULATED NATURAL LANDSCAPE IN A CAGE-FREE FACILITY TO IMPROVE ANIMAL WELFARE AND HEALTH

(71) Applicant: Iowa State University Research Foundation, Inc., Ames, IA (US)

(72) Inventors: Melha Mellata, Ames, IA (US); James H. Oliver, Des Moines, IA (US); Mark Lyte, Ames, IA (US); Suzanne Theresa Millman Hartline, Ames, IA (US); Rafael Radkowski, Ames, IA (US); Graham Redweik, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 128 days.

(21) Appl. No.: 17/660,652

(22) Filed: Apr. 26, 2022

(65) Prior Publication Data

US 2022/0338448 A1 Oct. 27, 2022

Related U.S. Application Data

(60) Provisional application No. 63/201,355, filed on Apr. 26, 2021.

(51) Int. Cl.
*A01K 29/00* (2006.01)
*A01K 15/02* (2006.01)
*H04N 13/363* (2018.01)

(52) U.S. Cl.
CPC ............ *A01K 29/005* (2013.01); *A01K 15/02* (2013.01); *H04N 13/363* (2018.05)

(58) Field of Classification Search
CPC .......... A01K 29/005; A01K 1/02; A01K 1/03; A01K 1/035; A01K 29/00; A01K 31/06;
(Continued)

(56) References Cited

U.S. PATENT DOCUMENTS 6,032,084 A * 2/2000 Anderson ............ H04N 13/194
348/E13.019
6,745,126 B1 * 6/2004 Pavlak ................... A01K 29/00
348/E13.019

(Continued)

OTHER PUBLICATIONS

Terrahe, Niklas, "Niklas Terrahe—Immersive Room 360° YouTube", Jun. 1, 2018 (Year: 2018).*
(Continued)

*Primary Examiner* — Brady W Frazier
*Assistant Examiner* — Zoe Tam Tran
(74) *Attorney, Agent, or Firm* — McKee, Voorhees and Sease, PLC

(57) ABSTRACT

An artificial and/or simulated environment is used to raise a domestic or commercially raised animal to promote a positive health feedback and to minimize stress on the animal. The simulated environment is used to create the façade of a free range or cage free environment, while also minimizing the exposure to inclement weather, potential predators, and other unknown or stress-inducing situations. The results include animals that have higher resistance to diseases and have a lower stress. The artificial environment can be created by projecting or otherwise showing images and/or videos depicting simulation of environments, climate, and/ or other unknown situations to normalize the animals to the same.

10 Claims, 5 Drawing Sheets

(58) Field of Classification Search
CPC .... A01K 1/0035; A01K 63/00; H04N 13/363; G06T 19/006
USPC .......................................................... 119/421
See application file for complete search history.

(56) References Cited

U.S. PATENT DOCUMENTS

| | | | | |
|---|---|---|---|---|
| 2002/0116200 A1* | 8/2002 | Cureton | ............... | A01K 5/02 |
| | | | | 348/E13.004 |
| 2010/0289879 A1* | 11/2010 | Sinzinger | ............... | A01K 29/00 |
| | | | | 348/46 |
| 2014/0159615 A1* | 6/2014 | Grajcar | ............... | A01K 45/00 |
| | | | | 315/307 |
| 2014/0209035 A1* | 7/2014 | Tang | ............... | H05B 47/10 |
| | | | | 119/416 |
| 2015/0068466 A1* | 3/2015 | Piccioni | ............... | A01K 1/033 |
| | | | | 119/448 |
| 2015/0250134 A1* | 9/2015 | Hicks | ............... | A01K 63/06 |
| | | | | 119/246 |
| 2017/0196196 A1* | 7/2017 | Trottier | ............... | A01K 15/027 |
| 2017/0365101 A1* | 12/2017 | Samec | ............... | G06T 19/006 |
| 2018/0192621 A1* | 7/2018 | Valatka | ............... | A01K 29/00 |
| 2023/0116693 A1* | 4/2023 | Broers | ............... | H05B 47/105 |
| | | | | 119/448 |

OTHER PUBLICATIONS

Brady, Vincent, "Vincent Brady—Planetary Panoramas—360 Degree Night-Sky Time-Lapse", Jun. 17, 2014 (Year: 2014).*

Dolins et al., "Using Virtual Reality to Investigate Comparative Spatial Cognitive Abilities in Chimpanzees and Humans", Am Journal of Primatology, vol. 76, pp. 496-513 Jan. 6, 2014.

Frasneli et al., "The Dominant Role of Visual Motion Cues in Bumblebee Flight Control Revealed Through Virtual Reality", Frontiers in Physiology, vol. 9, 11 pages Jul. 31, 2018.

https://www.bbc.com/news/world-europe-50571010, "Russian cows get VR headsets 'to reduce anxiety'", 4 pages, downloaded from the internet Apr. 21, 2021.

* cited by examiner

SIMULATED NATURAL LANDSCAPE IN A CAGE-FREE FACILITY TO IMPROVE ANIMAL WELFARE AND HEALTH

CROSS-REFERENCE TO RELATED APPLICATIONS

This application claims priority under 35 U.S.C. § 119 to provisional patent application U.S. Ser. No. 63/201,355, filed Apr. 26, 2021. The provisional patent application is herein incorporated by reference in its entirety, including without limitation, the specification, claims, and abstract, as well as any figures, tables, appendices, or drawings thereof.

FIELD OF THE INVENTION

The invention relates generally to the field of domesticated animals, such as the raising of the same. More particularly, but not exclusively, the invention relates to systems, methods, and/or apparatus for the use of simulated images and/or videos to create a simulated environment in an enclosed area to create the façade of a free-range or open environment for the promotion of positive health benefits to the domesticated animals.

BACKGROUND OF THE INVENTION

Domesticated animals are raised in environments for the purpose of providing food, such as protein, food products, such as eggs or milk, used for farming, or otherwise raised in a controlled, commercial manner. Poultry in particular is an inexpensive protein source that accounts for around 35% of all animal protein consumed in the world. The U.S. is the world-leading country in poultry meat and egg production with over 9 billion broilers hatched, raised, and processed annually and about 19% of products exported. In addition, around 83 billion eggs are produced annually in the U.S. and Iowa is presently the top egg producing state. Commercial poultry animals are housed in high-density environments to maximize product output like meat and eggs. However, in many caged and cage-free facilities, chickens lack complex natural environmental features with biological relevance, drawing ethical concerns from the public. Furthermore, although public interests have pushed commercial egg farms to shift towards cage-free housing, cage-free animals are at higher risk for infections, negative behaviors like cannibalism, as well as higher rates of injury and mortality. It is now widely accepted that stress affects innate immunity and host microbiomes, key factors in animal health and productivity. Naturalistic environments have potential for positive impacts on health and welfare of animals. Although free-range operations are also used to raise chickens, they are limited in their production capacity, and animals raised in these conditions are at-risk for predators, parasites/pathogens and harsh weather conditions.

Thus, technologies that allow the combination of naturalistic stimuli benefits of free-range housing with the productivity and husbandry benefits in cage-free, caged, and/or enriched cage facilities are drastically-needed.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to raise animals in an artificial environment that combines the benefits of cage-free and free-range farms without the limitations associated with the same.

The artificial environment may take many forms, such as including, but not limited to, projected images and/or videos, one or more walls comprising a screen or screens to display one or more of images and/or videos, one or more barriers capable of showing, projecting, or otherwise including an image or video of a simulated environment, or the like.

The one or more images and/or videos can take many forms, such as showing an environment, climate, or "new" situation. In such a "new" situation, the images and/or videos could be used to normalize or otherwise acclimate the animal to such an unknown to reduce the stress associated with the same. In addition, the images and/or videos could be considered stereoscopic.

It is still yet a further object, feature, and/or advantage to provide an artificial environment that promotes positive health and welfare of animals contained therein by reducing stress, minimizing irritation, and increasing disease resistance. The artificial environment, if habitually used, will also preferably decrease the likelihood of negative conduct in the animals contained therein.

It is still yet a further object, feature, and/or advantage to immerse animals within artificial environments during rearing, to maximize the effect of any training(s) and/or conditioning from the use of visual stimuli. In this way, these animals will not perceive the artificial environments as unfamiliar or threatening, but as an environment in which they can thrive.

It is yet another object, feature, and/or advantage to provide an artificial environment that mimics biologically relevant natural habitats of the animals in the environment. More particularly, the simulated environments emulate natural environments in housings for domesticated animals that combine the benefits of cage-free and free-range farms.

It is still yet a further object, feature, and/or advantage to use tools that track the physical and/or mental health of animals in the simulated environment.

This monitoring in turn allows for new housing environments to be evaluated that will positively impact the health and welfare of animals in captivity. Establishing these measures will allow producers to build best practices and create cost-effective strategies to further prevent infections in controlled environments, such as caged farms.

The systems and/or methods disclosed herein can be used in a wide variety of applications. For example, they can be used to mimic generally any types of environments to simulate cage-free or free-range environments for a wide variety of domestic and/or commercially raised animals.

It is preferred that the artificial environments be safe for the animals, result in animal products that are safe to consume, cost effective, and come from robust animals that have experienced good welfare. Where the use of antibiotics is banned, it can be critical that optimal housing conditions are employed to reduce stress and infections in the animals.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of an artificial and/or simulated environment which accomplish some or all of the previously stated objectives.

According to some aspects of the present disclosure, a method of promoting positive health and welfare of an animal in a controlled environment, the method comprises projecting and/or displaying one or more images to a portion of the controlled environment, said one or more images being a simulation on one or more barriers of the controlled environment and changing the one or more images to introduce updated the simulation to the animal in the controlled environment. The one or more images are chosen to reduce stress on the animal in the controlled environment. In a non-limiting example, the one or more images can comprise virtual reality to create the simulation of a naturalistic environment, including, but not limited to, indoor (nests, perches) and outdoor (vegetation) features.

According to some additional aspects of the present disclosure, the method further comprises introducing additional images to the animal via the controlled environment to normalize the animal to potentially stress-inducing situations by changing the simulation. The potentially stress-inducing situation can comprise exposure to a change in climate, to a potential predator, or to an unknown situation.

According to some additional aspects of the present disclosure, the method further comprises updating the one or more images to create the simulation of a daily cycle. The simulation of the daily cycle can be updated positioning of one or more celestial bodies.

According to some additional aspects of the present disclosure, the one or more images comprises stereoscopic images and/or a combination of still images and videos.

According to some other aspects of the present disclosure, a system for promoting positive health of one or more animals, comprises a controlled environment comprising one or more barriers for controlling the location of the one or more animals; and one or more images projected on the one or more barriers of the controlled environment to create a simulation of the controlled environment for the one or more animals. The one or more images can be chosen to reduce stress on the one or more animals in the controlled environment and/or can be changeable after a period of time to update the simulation in the controlled environment.

According to some other aspects of the present disclosure, a method of providing synthetic free-range experiences to animals in ranged captivity, comprising using a digitized, visual stimulus to effect senses of the animal such that the animal perceives engaging in and/or is encouraged to engage in a free-range activity or behavior and training the animal so as to increase a ratio of the positive behaviors to the negative behaviors by repeating the using and selecting steps. This ratio can be quantified and recorded over time. The method also includes selecting the free-range behavior so as to: encourage positive behaviors in the animal; discourage negative behaviors in the animal; and/or expose the animal to potential stressors. The visual digitized, visual stimulus can be two-dimensional and/or multichromatic.

According to some additional aspects of the present disclosure, the animal is an avian and the free-range activity or behavior(s) include perching, nesting, scratching, pecking, feeding/foraging, drinking, flocking, locomotion, flying, play, stretching, wing-flapping, dustbathing, preening, allogrooming, vocalizing and/or exploration.

According to some additional aspects of the present disclosure, the animal is a domesticated birds and mammals, such as felines, canines, bovines, porcines, ovines, caprines, equines, and/or murines.

According to some additional aspects of the present disclosure, the method can further comprise manipulating an environmental characteristic such as temperature, humidity, air pressure, ambient noise level, quantity of visible light, and/or terrain to exacerbate a perception of the avian and/or non-human mammals.

According to some additional aspects of the present disclosure, the method can further comprise testing samples of biological byproducts and/or materials taken from the animal during said ranged captivity to determine and/or monitor a health of the animal.

According to some other aspects of the present disclosure, a simulated range comprises a physical enclosure, animal(s) in captivity, a projector or display for showing a digitized, visual stimulus to the animal(s), and a computerized storage unit. The computerized storage unit a collection of digital images or motion pictures that, when shown by the projector or display, can be perceived by the animal such that the animal encouraged to engage in a free-range activity or behavior, and automatic means for executing procedures that habituate the animal to more regularly engage in positive behaviors, to less regularly engage in negative behaviors, and to train the animal to be able to handle potential stresses.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
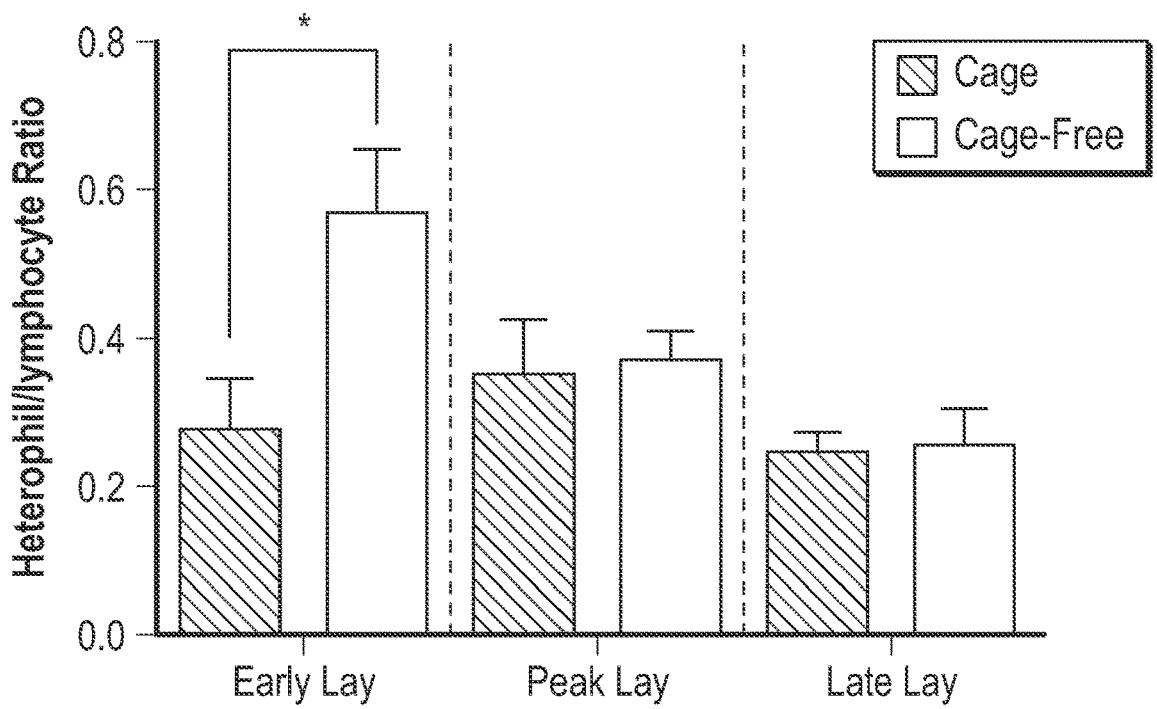
FIG. 1 comparatively graphs, at different maturity stages, heterophil/lymphocyte ratios for cage and cage-free birds (egg laying strain chickens), according to some aspects of the present disclosure.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Environmental and/or social factors have been known to cause stress in chickens and other domesticated or otherwise commercially raised animals, and associated problems of cannibalism, disease susceptibility, and low productivity. Many of these factors are more common in cage-free systems, to which farms will transition because of the United State (US) food industry and consumer demand for cage free chicken products. It is widely accepted that natural environments have a positive impact on health and welfare of animals. Free-range farms allow chickens to access outdoor settings, but they are limited in their production capability; and pathogens/parasite, weather and predators are major threats causing stress and even death in animals.

New housing environments that combine the benefits of cage-free and free-range farms without their limitations are needed and would greatly benefit the egg and poultry industries. Virtual reality (VR) technology has proven effective in treating a variety of human afflictions, but its application to animal health has yet to be explored. In particular, some animals have different sensory perception than humans and/or have different perception and processing of virtual reality technologies.

To address this, the controllable artificial environments described herein, can be effective to improve animal behavior and/or health because they mimic natural landscapes to evaluate the effect of specific environment factors and their interaction on animals. The artificial environments employed herein are environments where animals perceive being in more complex naturalistic environments even though they are kept in captivity. These environments are a means to improve welfare and health of animals (and in particular, egg laying strain chicken) raised in an indoor cage-free environment.

The artificial environments discussed herein employ engineering, microbiology, neurochemicals and animal behavior to simulate natural-like landscape in poultry housing using modern video and imaging technologies to improve chicken well-being, e.g., behavior, weight, feather cover, bone strength and survivability.

Improving Conduct

Animal behaviors can be modified using visual stimuli. The visual stimuli can be placed on barriers, including, but not limited to one or more of, walls, fences, cages, fences, or other structures in the environment, of an enclosure that keeps farmed animals in captivity. These visual stimuli are intended to facilitate desirable/adaptive behaviors, and to discourage undesirable/harmful behaviors. Negative behaviors are ideally minimized, and positive behaviors are ideally maximized, with the ratio of positive conduct to negative behavior ideally being as large (positive) as possible.

Negative behavior(s) can include, but are not limited to, any one or more of the following behaviors: undesirable reproductive behaviors (e.g., floor eggs), anorexia, anxiety injurious pecking and cannibalism, broodiness, coprophagia, pica (drinking/eating materials other than food), excessive aggression, flightiness/hysteria/excessive pecking/plucking, alarm vocalization, obsessive-compulsive disorder, self-injury, stereotypy, untimely molting.

With respect to positive behavior, e.g., foraging, feeding, drinking, dustbathing, perching, nesting, preening, stretching, wing-flapping, play, locomotion, flying, exploration and spatial distribution/range use. Stimulus-rich, biologically relevant and safe environments trigger positive behaviors in animals. A digitized natural-like environment in confined poultry housing can effectively improve desirable animal behavior, as well as improve animal welfare, health and productivity.

Monitoring of Health

The examples below are discussed with relation to chickens, though the following principles can apply to other animals as well.

Environmental and social factors cause stress in chickens, which lead to cannibalism, disease susceptibility, and low productivity, e.g., premature termination of egg production. Studies have found a correlation between the level of serotonin-5HT and dopamine ("DA") and feather picking in chickens. Corticosterone and neurochemicals and their level in chickens raised with and without artificial environments can be identified, with a further focus on innate immune compounds that are important for the recognition and elimination of pathogens and initiation of the adaptive immune response and they could be affected by environmental factors. The compounds of blood (WBC and complement) in inflammation and combating systemic bacteria, e.g., APEC that cause one of the most important diseases in poultry farms.

The bacterial persistence in chicken, e.g., foodborne bacteria *Salmonella* that is mainly sourced from chickens can also be evaluated.

Behaviors, stress, and disease resistance can be near-continuously monitored. Monitoring can include manually observing and recording behavior and measuring computational and biological parameters, such as neurochemicals (stress), immune cells, and functions (disease resistance). A set of protocols in the lab to quantitate neurochemicals that have enabled us to reproducibly determine amounts in a wide spectrum of samples including chicken feed and intestinal contents throughout the chicken alimentary canal.

As noted, the monitoring can be done in real-time to determine if any change needs to be made to one or more of the visual stimuli, or can be reviewed at a later time. The later review can be used to update a system to best set up the environment to active one or more of the goals of the simulated environments.

Animal health data can be analyzed by associating data with the amount and/or type of microbiota, in vitro assays, neurochemicals, and short chain fatty acids present in samples that are collected from the pen.

Comparison of chickens raised with and without simulated ranges at different ages can determine to what degree the artificial environment affects the chicken innate immune cells at specific or all ages and resistance to avian pathogenic *Escherichia coli* ("APEC") infection and *Salmonella* persistence. The heterophil/lymphocyte ratio can be calculated, which is considered a measure of stress.

The effect of housing and hen's maturity on bactericidal effect of the blood on APEC serotypes, similarly will be determined to decide whether artificial environmental housings increase blood bactericidal effect APEC strains.

Additionally, since host-derived neurochemicals can affect bacterial replication, mucosal- and gut lumen-associated cells, as well the structure of the microbiota associated to the mucosal surface and gut lumen and there is a correlation between *Salmonella* persistence and the level of corticosterone in chickens, the difference in *Salmonella* persistence in chickens housed with and without artificial environments is significant.

A correlation can also be made between the level of corticosterone and the bone strength. Since neurochemicals affect the in vitro growth of pathogenic bacteria and infections, it can be determined which neurochemical is associated to resistance/sensitivity to different APEC serotypes and *Salmonella* persistence.

Stress affect both growth and bone strength in chickens, measuring the weight and osteoporosis in chickens housed with and without artificial environments can determine whether artificial environments improve the body mass gain and strength of the bone, which is a major problem in poultry housing. A correlation can be made between computational behavior, feed-intake, body weight, bone quality, and physical examination (injuries, loss of feather). The use of an artificial environment can affect the amount of aggressive interactions and thereby result in a less stressful environment and ultimately improved chicken health and well-being.

Testing Procedures, Results, and Data

Blood can be collected from wing vein using heparinized syringes. A blood drop (approximately 3 µL) is deposited onto a standard microscope slide, air dried, fixed, and stained with the Diff-Quick kit. Using light microscopy, — 200 leukocytes will be categorized (lymphocytes, monocytes, heterophils, basophils, or eosinophils). The killing ability of blood can then be evaluated by examination of bacterial survival following a thirty min incubation in 90% blood from chickens. At least eighteen different APEC serotypes can be tested in blood assays.

Egg laying strain chickens were raised and tested in commercial conventional and cage-free farms during early, peak, and late laying stages of production, for the level of their immune cells, corticosterone and neurochemicals, and their disease resistance. Data showed that hen's biological markers affected were level of blood white cells (BWC), bacterial ability of blood, level of blood corticosterone, and level of blood neurochemicals.

The results shown in FIGS. 1, 2, 3A, and 3B are from a paper, "Microbiome and biological blood marker changes in hens at different laying stages in conventional and cage free housings", published in Poultry Science, Volume 99, Issue 5, May 2020, Pages 2362-2374, and which is hereby incorporated by reference in its entirety.

BWC (Lymphocytes, heterophils, monocytes, basophiles) levels evaluated using staining and microscope observation on blood smears, determined that levels of cells affected were that of heterophils and lymphocytes. As shown in FIG. 1, the heterophil/lymphocyte ratio, considered a measure of stress, was significantly ($P<0.05$) lower in caged egg laying strain chickens during early-lay than that of cage-free egg laying strain chickens from the same maturity group. No significant difference was seen in other groups.

*Salmonella Typhimurium* $\chi 3761$ can be used to oral challenge chickens housed with and with without artificial environments with 0.1 ml (108 CFU) of PBS. The level of CFU is then evaluated weekly in fresh feces. At thirty-day post-infection, chickens can be necropsied. Ceca and ceca content will be recovered and processed for enumeration of CFU/g.

Figure 2:
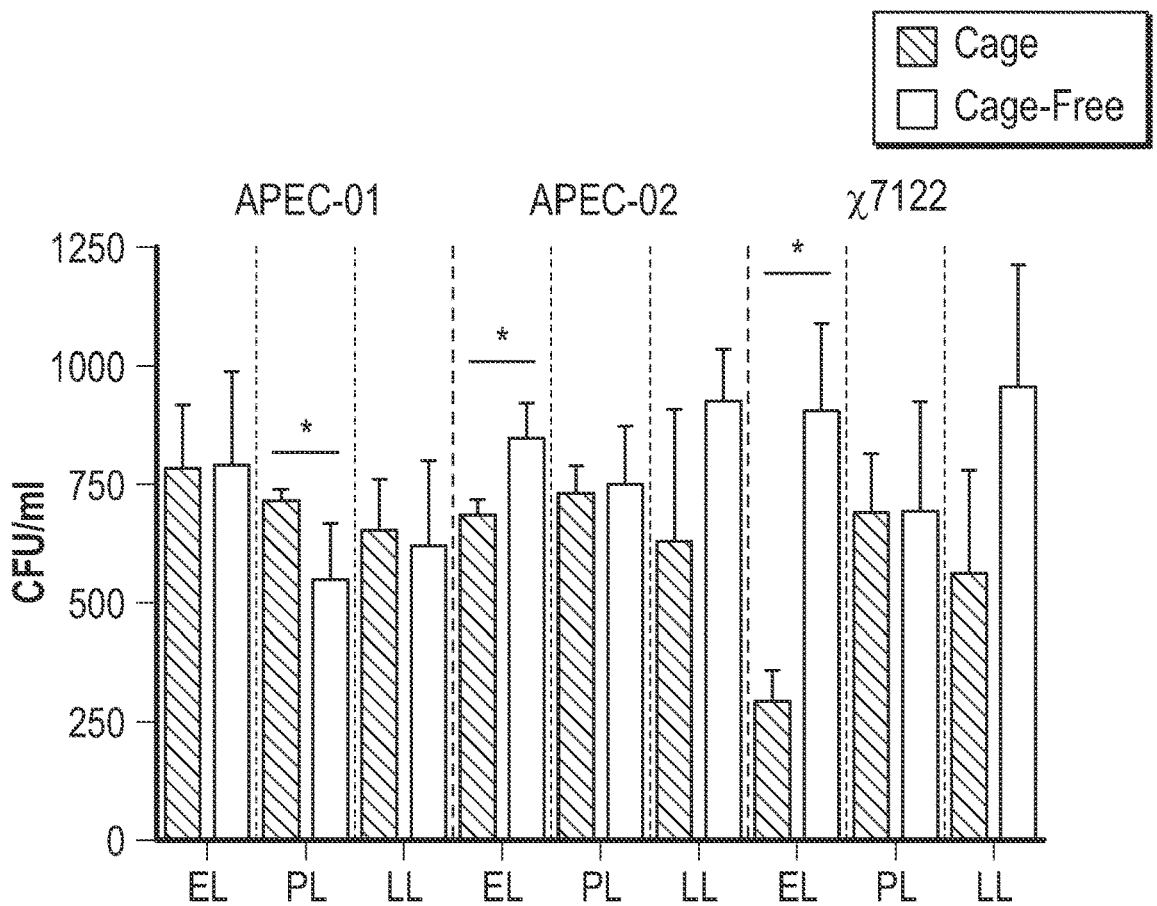
FIG. 2 comparatively graphs, at different maturity stages, bactericidal ability of blood on APEC strains for cage and cage-free birds (egg laying strain chickens), according to some aspects of the present disclosure.

The in vitro bactericidal ability of blood against multiple APEC serotypes (102 CFU/200 µl of fresh heparinized-blood in thirty minutes), has showed that overall blood from caged egg laying strain chickens reduced growth of bacteria better than that from cage-free egg laying strain chicken. Significant increased killing ability was demonstrated in blood from caged egg laying strain chickens compared to cage-free, during early lay with APEC-02 and $\chi 7122$, whereas an opposite result was found in peak lay group with APECO1, as shown in FIG. 2. Altogether, the data of FIG. 2 showed that hen's susceptibility to different APEC serotypes could be differently affected by the housing and maturity.

Figure 3A:
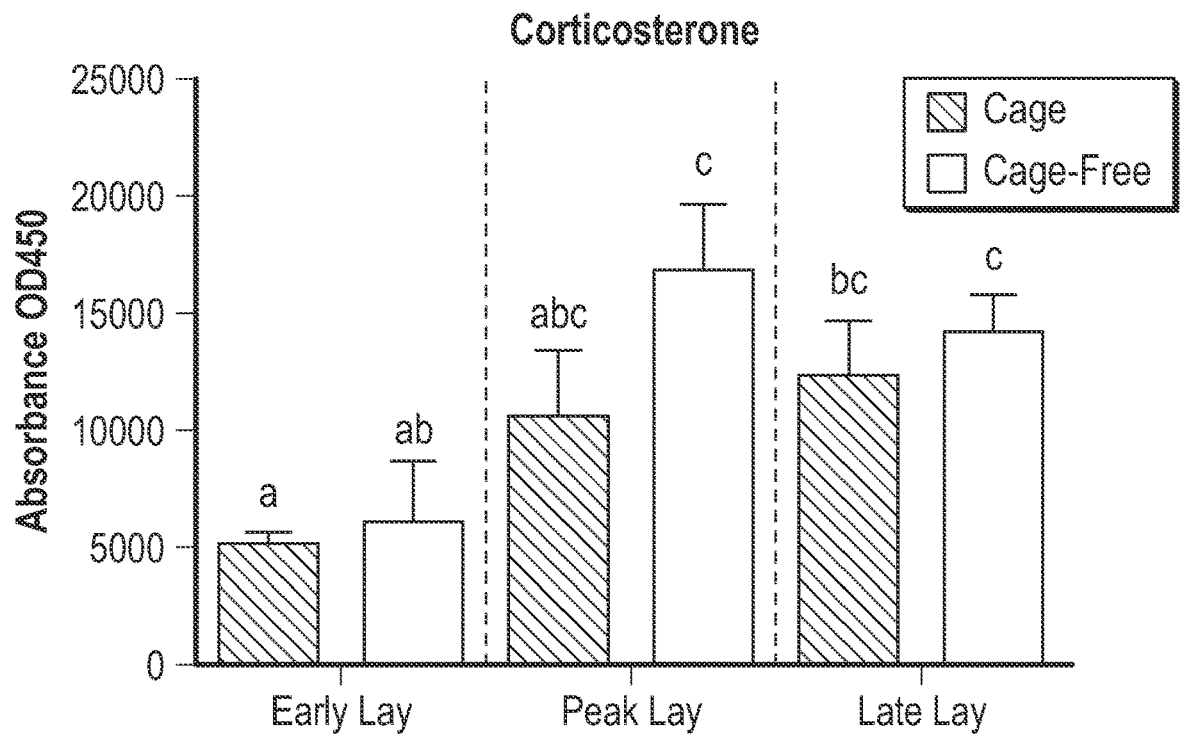
FIG. 3A comparatively graphs, at different maturity stages, levels of corticosterone for cage and cage-free birds (egg laying strain chickens), according to some aspects of the present disclosure.
Figure 3B:
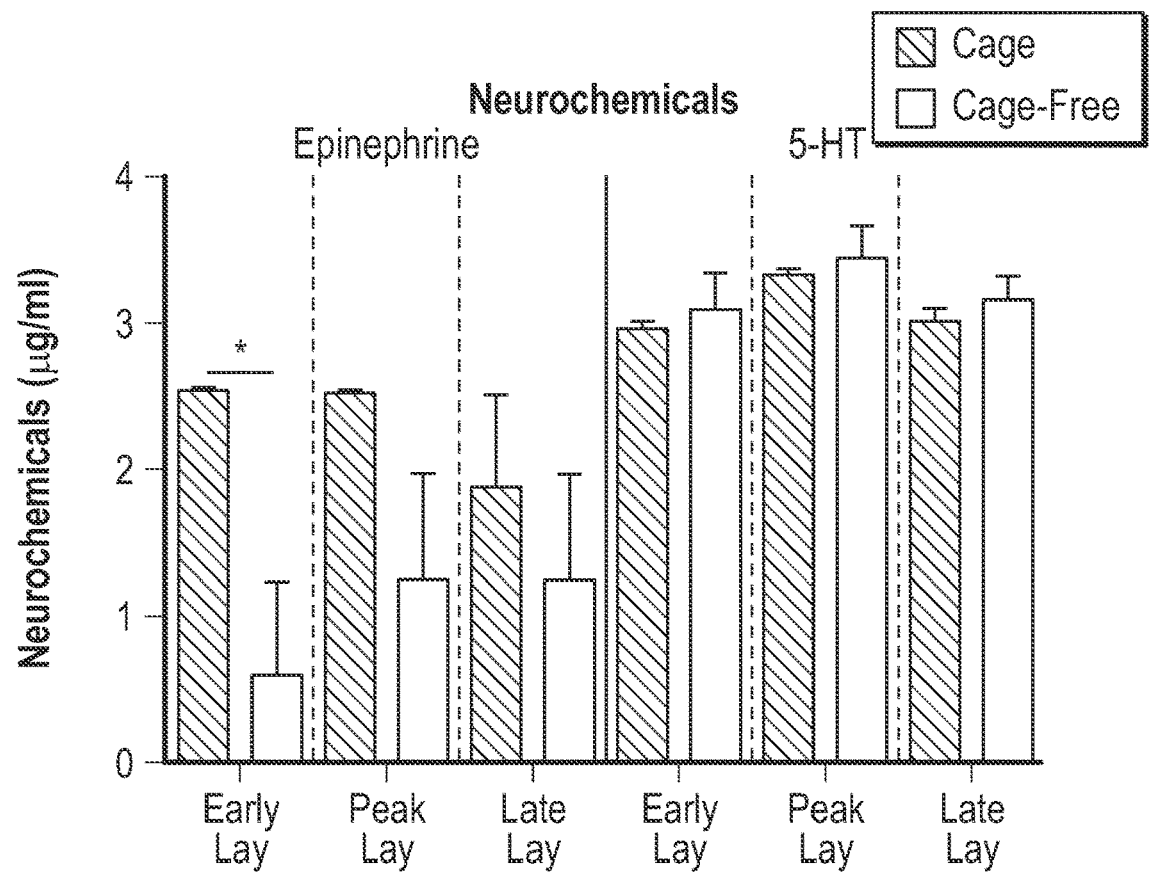
FIG. 3B comparatively graphs, at different maturity stages, levels of neurochemicals for cage and cage-free birds (egg laying strain chickens), according to some aspects of the present disclosure.

Corticosterone, one of the most important glucocorticoids ("GCs") in poultry, affects the innate immune system of chickens and increases the risk of bone disorders. RT-PCR can be used to quantify the level of corticosterone in the sera of chickens raised with and without artificial environments. In chickens, high level of corticosterone in the blood alters metabolic processes and growth, and delay egg laying. The highest levels of this stress hormone, as measured by ELISA in the serum, were found in peak- and late-lay egg laying strain chickens, with difference being significant in peak-lay egg laying strain chickens of cage-free, as shown in FIG. 3A.

Ultra-high-performance liquid chromatography with electrochemical detection ("UHPLC-ECD") can be employed to high throughput identify and quantitate neurochemicals, e.g., stress-related neurochemicals, norepinephrine and epinephrine in sera and intestines, e.g., ceca, of chickens raised with and without artificial environments. Using ultra-high-performance liquid chromatography with UHPLC-ECD to identify and quantify egg laying strain chickens' serum neurochemicals, both known neurochemicals, e.g., Epinephrine and 5-hydroxytryptamine (5-HT), were detected. No significant difference in 5-HT was found between groups, while the level of Epinephrine was higher in caged egg laying strain chickens, with the difference being significant in early-lay group, as shown in the bottom portion of FIG. 3. Epinephrine can affect the food passage in the upper digestive tract in chicks, hence the growth.

Figure 8A:
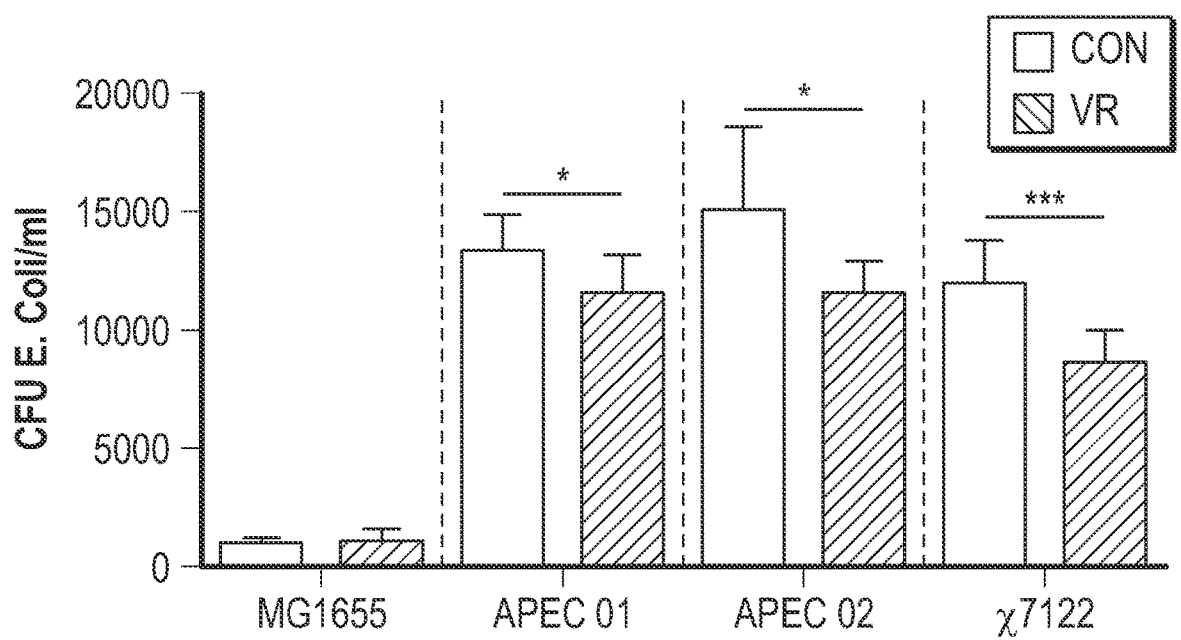
FIGS. 8A-8C are graphs showing the use of artificial visual stimuli increases the resistance to avian pathogenic *E. coli* (APEC).
Figure 8B:
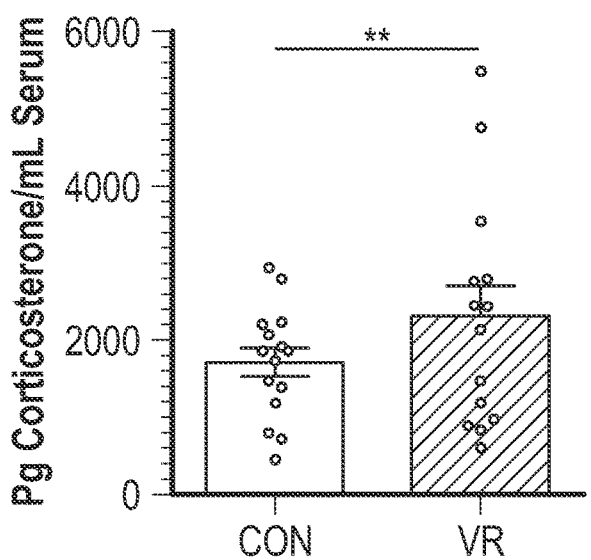
Figure 8C:
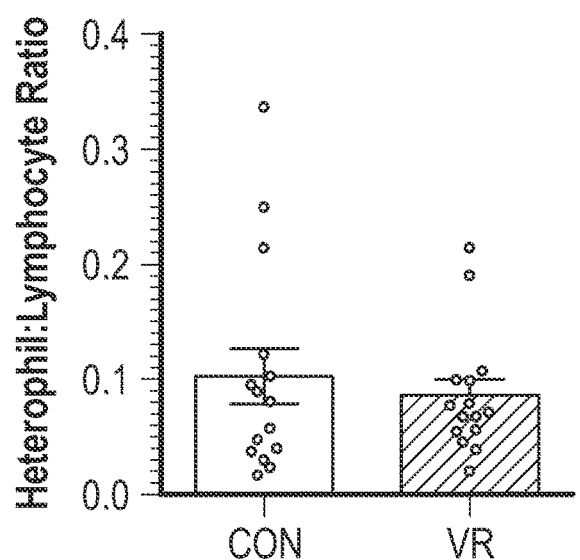

In addition, FIGS. 8A-8C provide graphs showing a summary of data from chicken circulatory system (blood and plasma). Differences in E. coli blood bactericidal responses in vitro (A), plasma corticosterone levels (B), and heterophil:lymphocyte ratios (C) were evaluated between CON and VR hens. *, $P<0.05$; , $P<0.01$; *, $P<0.001$. Using a blood bactericidal assay to test resistance to APEC, it has been found that blood from artificially-stimulated hens exhibited higher APEC killing to the three APEC serotypes 01, 02, and 078 tested compared to CON hens ($P<0.05$; FIG. 8A). This phenotype was positively-associated with a slight-increase in serum corticosterone levels ($P<0.01$; FIG. 8B). However, H:L ratio was statistically-identical between treatment groups ($P>0.05$; FIG. 8C).

Altogether, use of the artificial environment improves diseases and wellbeing in chickens. More beneficial quantitative levels of corticosterone and neurochemicals known to be critical to an animal's response to stress and that are capable of directly influencing brain and behavior in tissue and fecal samples from animals in control and artificial environments are measurable.

For example, through examination of regional sections of the gut, the first ever biogeography of the neurochemicals production in poultry has been established.

Equipment

A simulated range 100 is provided in the form of a type of artificial environment. The simulated range 100 is a way to generate a controllable artificial environment that mimics an animal's natural environment, or at least a cage free or free-range environment. Use of the simulated range 100 can help evaluate specific environment factors and their interaction and determine the best combination that will have a beneficial effect on the animals kept therein.

Figure 4:
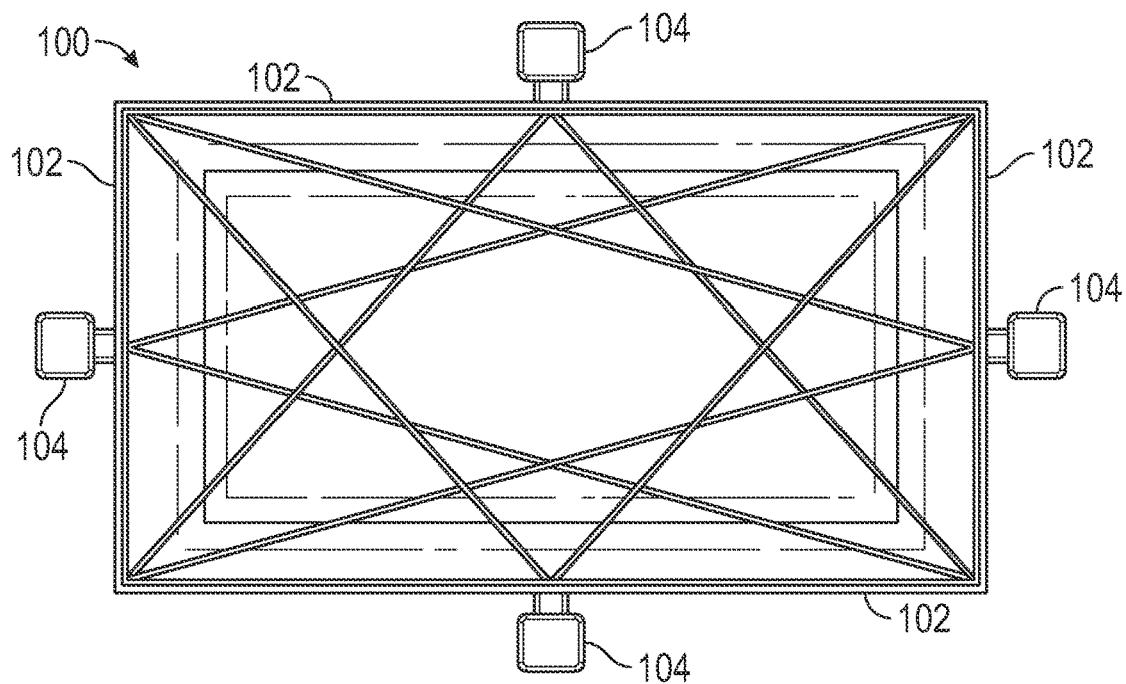
FIG. 4 shows a two-dimensional schematic view of an artificial environment having four projectors, according to some aspects of the present disclosure.
Figure 5:
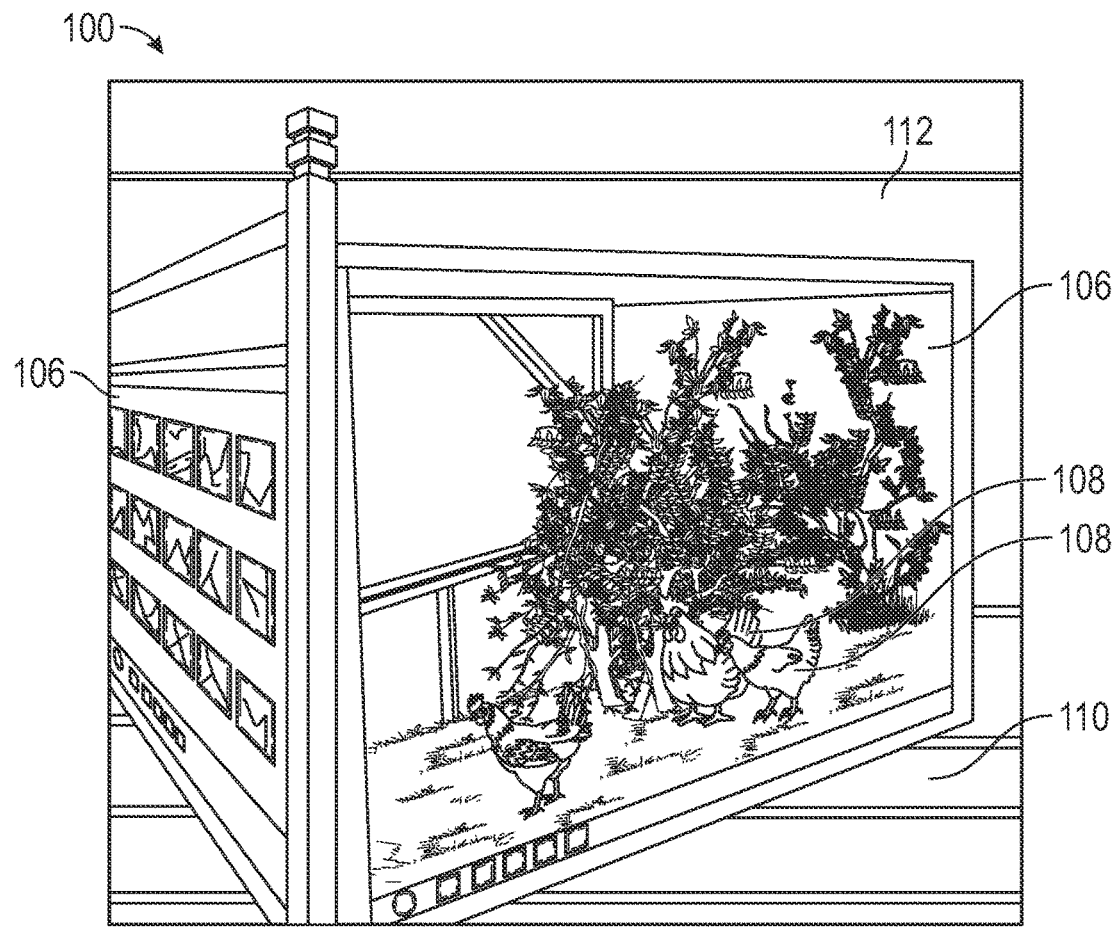
FIG. 5 simulates a three-dimensional range for birds kept in captivity, implementing the technical aspects of the artificial environment of FIG. 4.

More particularly, a poultry pen is shown is shown in FIGS. 4-7. According to a non-limiting example, the poultry pen shown in FIG. 4 is an enclosure with sidewalls 102 (e.g., including, but not limited to, plywood) approximately four feet in height, with one or more (e.g., four) projectors 104, a personal computer, a storage device storing files for video/image content 106, and animal supplies 114 needed to keep the animals in good health.

The interior surface of each wall 102 is painted white or other soft color and illuminated by one of the projectors 104 mounted on a pedestal on the opposite wall 102. A door in the pen 100 can be incorporated to facilitate feeding, cleaning and maintenance of the pen by research personnel. The artificial environment 100 can be integrated into a standard animal research housing unit.

There are several options for creation of the dynamic visual content 106 experienced by the chickens. One option is to model a 3D free-range agricultural scene and render it via computer graphics onto the walls 102. This would enable unlimited modification of environmental parameters to facilitate research but would entail considerable effort. Alternatively, a physical free-range scene could be captured, via an omni-directional video camera and streamed live into the artificial pen. This would enable the depiction of "natural" phenomena, such as weather and light (e.g., time of day correlated with correct solar position). Video loops can be used to show omni-directional video clips of an idyllic countryside scene. The scene can include elements that move, e.g., adjacent farm animals, native birds, as well as typical farm sounds. The loop may be edited so that the beginning and end are roughly coincident, which will enable continuous looping without substantial visual artifacts. Ambient environmental lighting effects to reflect the time of day can be approximated by varying the brightness of the displays, thus enabling an approximation of sunrise and sunset. A depiction of the artificial pen is presented in FIG. 5. Still further, still images can be provided to depict one or more "natural" images.

While projectors and still images and/or videos are disclosed, it should be appreciated and understood that the visual stimuli can be provided in a number of ways. This can include, but is not limited to, murals on one or more of the barriers (e.g., walls of the pen), banners or other independent materials that can be hung or otherwise strung on one or more barriers/walls of the pen, making one or more of the walls out of a visual promulgating device (e.g., liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc.), virtual reality (VR) devices, or the like.

The visual stimuli can be used to reduce the stress and promote positive health aspects to the animals. In addition, the visual stimuli can be used to introduce and/or normalize behavior that may otherwise be perceived as dangerous or stress inducing. Such stimuli can include, but is not limited to, the introduction of perceived threats (e.g., humans), the introduction of changing environments (e.g., transportation vehicles that may be used to transport the animals at some point), introduction of audio/noise elements, the introduction of changing weather to prepare the animals for upcoming climate changes, the introduction of new and/or maturing animals to the pen so as to prepare for a change in environment, or any other change that can be addressed and normalized via the visual and/or audio stimuli. In any usage, the result will be an immersive or semi-immersive environmental enrichment to the animals housed in the cage. This is done by creating an environmental perception by the animals that will be different than the actual environment they are contained.

Animal supplies 114 can include food, water, and/or shelter, and will depend on the specific species of domesticated animal 108 kept in the enclosure. Some enclosures, particularly those where vulpines and/or murines are being kept in captivity, will beneficially include a rigid floor 110 to prevent animals from digging out. Other enclosures, particularly those where avians are being kept in captivity, will beneficially include a ceiling 112 to prevent animals from flying or climbing out. The floor 110 and/or ceiling 112 can also be employed to make the enclosure more stable, if nothing else.

To further increase the effect of the visual stimulus 106, additional sensory enrichment, e.g., additional visual and auditory stimuli, can be provided by the artificial landscape.

A tracking camera at an upper location 116 can be used within the pen to track the health of the animals, such as chickens, contained within same. The tracking camera can be a computer vision system to facilitate tracking of the physical movement of each animal. An overhead video camera will capture the scene inside the pen and each chicken will be tagged with an active infrared marker. Computer vision techniques can also be employed to compute and record the travel of each animal throughout the day.

The pen can also be equipped with any supplies needed for all biosafety level ("BSL")-2 bench work, such as processing animal samples (plastic-glassware, media, chemicals, needles, etc.), and for neurochemical analyses, can also be included.

Finally, physical enrichment 118, e.g., toys, can also be included so that the animals can touch, use (e.g., to perch on), and/or play with same.

Example 1: Photographs with Perching-Related Test Results

Figure 6:
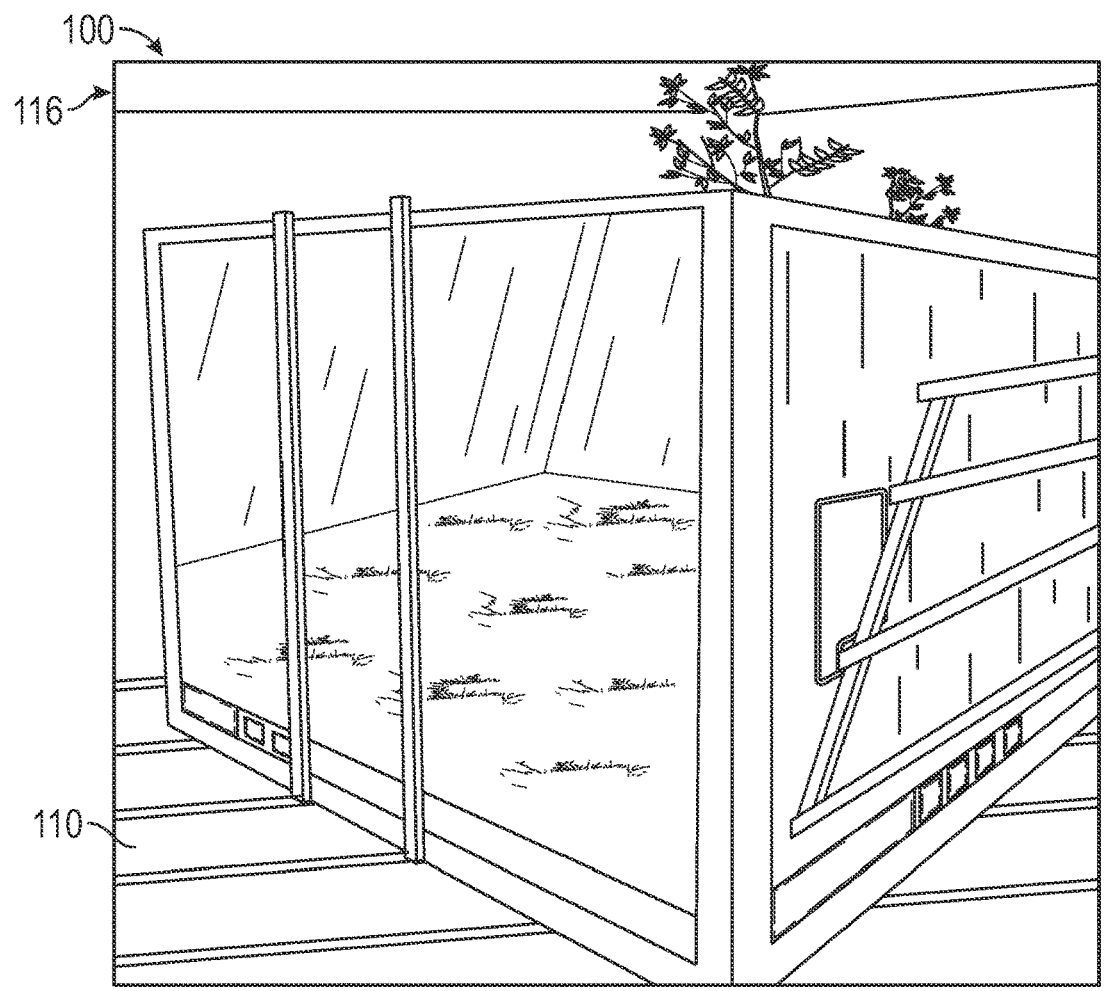
FIG. 6 is a depiction of an artificial landscape in an exemplary poultry cage-free housing, wherein a camera is included to monitor the health of the birds kept therein.
Figure 7:
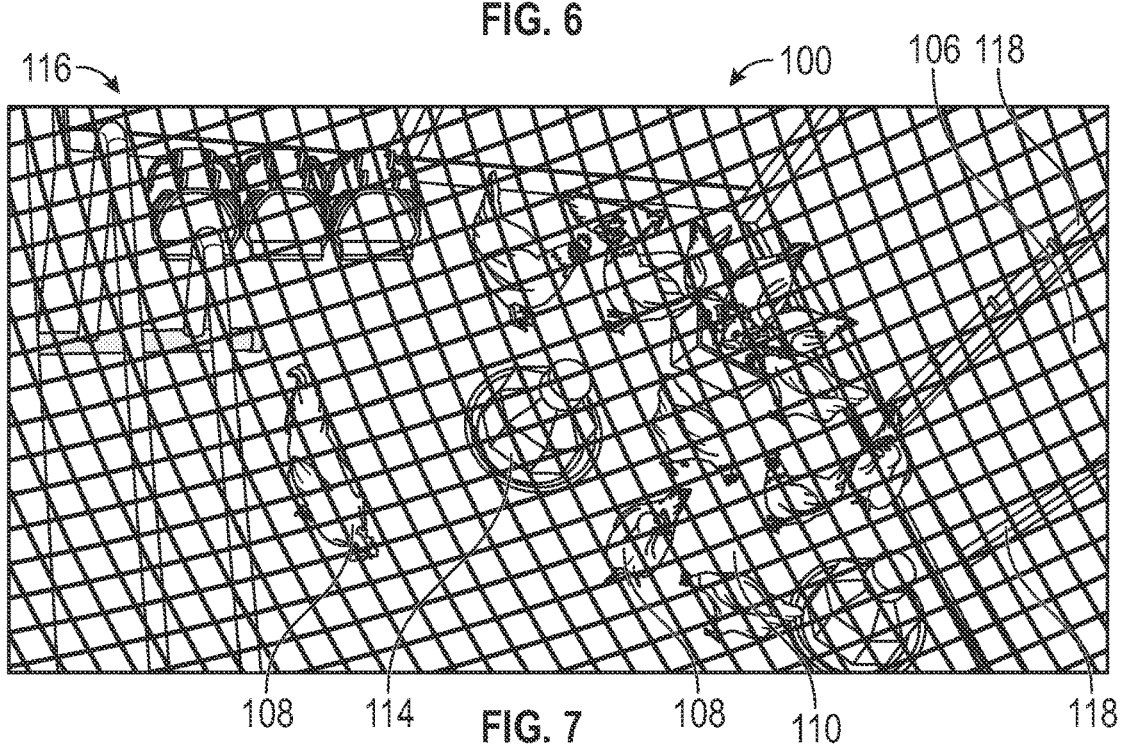
FIG. 7 is another depiction of birds in an artificial landscape of an exemplary poultry cage-free housing, wherein birds are engaged in a different positive behavior (foraging/feeding/roaming).

As shown in FIGS. 6-7 an artificial storyboard was created, which included video and still-images hypothesized to induce stress-inducing, stress reducing and neutral associations in egg laying chickens. Perching is a species-typical, socially facilitated behavior in chickens. Egg laying strain chickens and pullets display perching for a variety of reasons, and it can influence stress as well as comfort.

In this specific example, fifteen White Leghorn pullets were housed in a 9 ft×9 ft pen. The photo period was 16L:8D, 0500-2100. One of the four artificial environment scenes was projected on each pen wall, depicted a free-range flock interacting with a perching area, a nesting area, an outdoor scratch area, and an outdoor vegetative area. The perching area storyboard switched between still images (with no egg laying strain chickens present) and video images (with egg laying strain chickens actively perching) at the beginning of each hour, beginning at 0600. Pullet behavior was video-recorded with a camera positioned over the pen, providing an overhead view of the pen. Plumage of each pullet was uniquely marked with colored food dye for identification, as shown in FIGS. 6-7.

Behavior observations were performed using one minute instantaneous scan sampling, beginning five minutes before video switched at the hour and for five minutes following the video switch, over two days. A generalized linear mixed model was used to analyze perching probability across the time points (SAS, v9.4; $p \le 0.05$).

Perching by pullets was not synchronized with perching by egg laying strain chickens in the artificial environment during proximate (five-minute) periods following exposure (p=0.07), as shown in Table 1 below:

| Day | Hens in Artificial Env. | Total Perching |
|---|---|---|
| 3 | Perching | 109 |
|   | Not Perching | 117 |
| 4 | Perching | 116 |
|   | Not Perching | 105 |

Observation suggests pullets were aware of and responded to the digitized images and videos, which is consistent with other studies in which egg laying strain chickens attended to and recognized individual birds from photographic images.

Example 2: Procedure for Housing Conditions, Sampling, Feed Conversion, Physical and Bone Quality Examinations Chickens can be raised under 12:12 light/dark cycles at a density of 518 in$^2$/to mimic cage-free conditions. Separate rooms can be used for pens with and without artificial visual stimuli as described above. The duration of experiment can be up to two to three months to test at least two different stages of maturity (immature and onset of lay). Chickens can be weighted weekly, and sampling can be completed as stated in Aim 2 for a total of one-hundred twenty chickens. The feed conversion can be determined as the ration of total feed consumed and the weights of birds in a pen. Fewer birds have to be euthanized to collect femur bone and dual-energy x-ray absorptiometry (DXA) and EM can be used to measure osteoporosis. From each housing system, a sample of minimum sixty chickens total (thirty chickens per time×two rooms)×three time points. The number of chickens to sample from, can be calculated using G*Power software with the option F test, ANOVA (repeated measures within factors), a err probability=0.05, and Power=0.80. The condition of the skin and plumage of the head, neck, breast, back, tail, wings and vent can be scored at different times, e.g., two to eight weeks.

Other Embodiments

Aspects of the present invention are often discussed above in relation to avians such as chickens. However, it is to be appreciated aspects of the artificial environments discussed can be applied to any suitable domestic animals, including but not limited to felines, canines, lupines, vulpines, bovines, porcines, ovines, caprines, and equines.

Further, their system is also capable of in-line fraction collection, which they are able then to submit unknown peaks for identification by mass spectroscopy. As they possess 2 complete systems, he has been able to use different detectors on each including the use of boron-doped diamond electrodes. This enables the running of samples at higher voltages and helps in the discovery of new compounds. This approach has already yielded the identification of a neurotoxin present in the gut that had been unknown to occur anywhere outside of the central nervous system. Behavior observation together with neuroendocrine analysis will show causation.

From the foregoing, it can be seen that the invention accomplishes at least all of the stated objectives. For example, several unique biological parameters of animals can be affected by simulated landscapes/environments, such as mimicking a cage-free and/or free-range environment in a controlled or caged environment. The use of the simulation can modulate the gut microbiome, which is related to the production of several neurochemicals and associated metabolites in the gut.

The following table of reference characters and descriptors are not exhaustive, nor limiting, and include reasonable equivalents. If possible, elements identified by a reference character below and/or those elements which are near ubiquitous within the art can replace or supplement any element identified by another reference character.

The invention claimed is:

1. A method of promoting positive health of a non-human animal in a controlled environment, the method comprising:
    projecting one or more images to a portion of the controlled environment, said one or more images being a simulation on one or more barriers of the controlled environment;
    monitoring the non-human animal in response to the projected one or more images, wherein the monitoring comprises observing behavior and measuring computational and biological parameters of the non-human animal; and
    changing the one or more images to update the simulation to the non-human animal in the controlled environment based on the monitoring of the non-human animal;
    wherein the one or more images are chosen to reduce stress on the non-human animal in the controlled environment by simulating stimulus-rich, biologically relevant, and safe environments to trigger positive behaviors in the non-human animal, based on the monitoring of the non-human animal.

2. The method of claim 1, further comprising introducing additional images to the non-human animal via the controlled environment to normalize the non-human animal to potentially stress-inducing situations by changing the simulation.

3. The method of claim 2, wherein the potentially stress-inducing situation comprises:
    a. exposure to a change in climate;
    b. exposure to a potential predator;
    c. exposure to an unknown situation.

4. The method of claim 1, further comprising updating the one or more images to create the simulation of a daily cycle.

5. The method of claim 4, wherein the simulation of the daily cycle comprises updated positioning of one or more celestial bodies.

6. The method of claim 1, wherein the one or more images comprises virtual reality to create the simulation of an outdoor environment.

7. The method of claim 1, wherein the one or more images comprises stereoscopic images.

8. The method of claim 1, wherein the one or more images comprise a combination of still images and videos.

9. The method of claim 8, wherein one of the still images or videos are projected on each of the one or more barriers.

10. The method of claim 1, wherein the one or more images promote positive health for the non-human animal.

* * * * *